July 14, 1936.                H. J. SMITH                2,047,234
                     CONDITION CONTROL APPARATUS
                       Filed Aug. 24, 1932         3 Sheets-Sheet 1

INVENTOR
Hazen J. Smith
ATTORNEY

July 14, 1936.                H. J. SMITH                2,047,234
                        CONDITION CONTROL APPARATUS
                        Filed Aug. 24, 1932            3 Sheets—Sheet 3
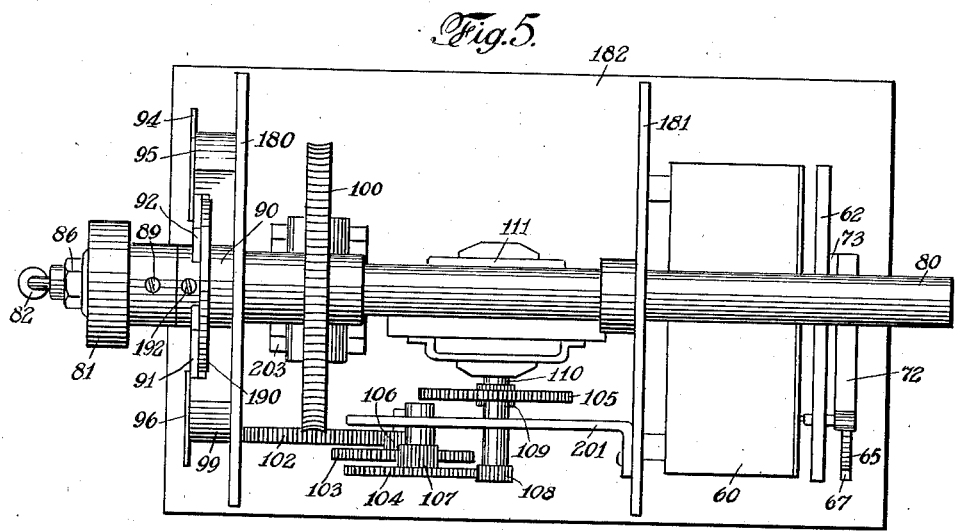
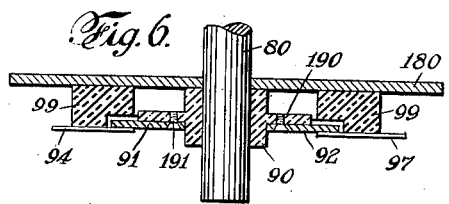
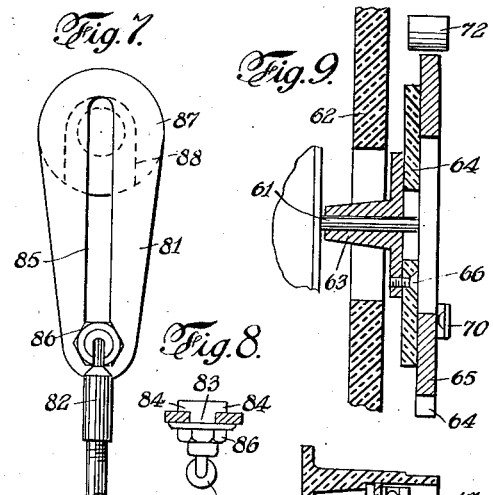
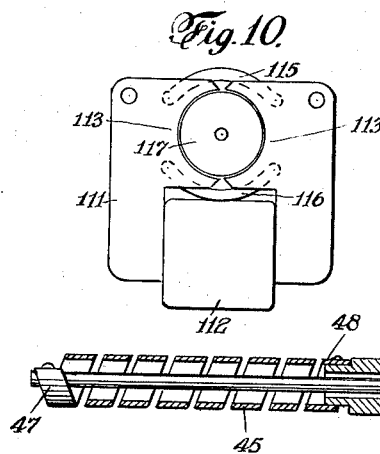
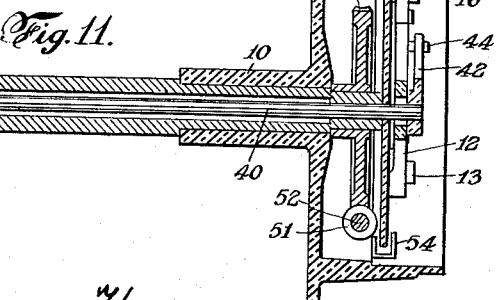
INVENTOR
BY
ATTORNEY Patented July 14, 1936

2,047,234

UNITED STATES PATENT OFFICE 2,047,234

CONDITION-CONTROL APPARATUS

Hazor J. Smith, Springfield, Mass., assignor to Superstat Company, Springfield, Mass., a corporation of Massachusetts Application August 24, 1932, Serial No. 630,230

3 Claims. (Cl. 236—74)

This invention relates to an automatically operated condition-control apparatus, and more particularly to an apparatus for maintaining a substantially constant temperature or pressure condition.

The invention is particularly applicable to the control of the heat of a furnace in response to variations in temperature and, for purposes of illustration only, will be described in connection with such a system, although the invention is capable of various other uses. For example, the invention may be used to control the pressure of a steam boiler, the temperature of a room, or the like. In any such system, the condition is controlled by a variable condition-control device which is automatically operated in response to variations in a condition-responsive device.

An object of the invention is to provide a control of the type above specified which compensates for minor fluctuations in condition by small successive changes in the condition-control means, each change being adapted to produce a given compensation in a given time interval.

Another object is to provide a system in which the number of successive changes is dependent upon the range of variation in the condition.

Another object is to provide a control which varies in proportion to the range of variation of the condition.

A further object is to provide a multiple range control which is adapted to compensate for both wide and narrow fluctuations in condition.

A still further object is to provide a control in which the response to narrow fluctuations in condition is proportional to the range of said fluctuations and in which wide changes in condition cause a predetermined greater change in control.

Another object is to provide a sensitive, dependable condition-responsive device.

The invention also consists in certain new and original features of construction and combinations of parts which may be better understood by referring for purposes of illustration to the embodiment of the invention as applied to the temperature control of a furnace. In this embodiment the furnace fire is increased or decreased by varying the fuel supply, draft, or the like, in response to a thermostatic control means.

The present invention provides a timed control having an interval bearing a definite relation to the change factor of the furnace. The relation is such that a small change in temperature serves to increase or decrease the fire by a given amount which bears a relation to the change factor of the furnace such that the normal temperature would tend to be restored in a given period of time. At the expiration of this period, if the temperature has not been restored to normal the timed control operates to cause a further given change in the fire. This step-by-step operation is repeated at successive intervals until the temperture has been restored to normal. If the temperature passes normal in the opposite direction a reverse step-by-step operation takes place at similar intervals until equilibrium is finally attained.

In certain instances, a sudden wide change in temperature may occur as, for example, due to opening of the furnace door. This would require a considerable time for correction if the relatively slow acting step-by-step mechanism alone were relied upon. In order to overcome this difficulty, the present invention provides a quick-acting control which is brought into operation in response to wide fluctuations in temperature. This control causes a correspondingly great variation in the fire so as to quickly restore the condition to normal.

For purposes of illustration, assume that the furnace is to be operated at a given temperature and to be normally maintained within a two degree temperature range. When the temperature falls two degrees below the normal operating temperature the thermostat closes a circuit adapted to actuate the step-by-step control. The step-by-step control then causes a given change in the furnace-operating mechanism, such, for example, as by opening the fuel supply a given amount, which amount is normally adapted to raise the temperature of the furnace two degrees within a time period of say three minutes. If, at the expiration of this period, the temperature has not been restored to normal, the step-by-step mechanism operates to open the fuel supply a further amount. This operation is then repeated at intervals as long as the cold contact of the thermostat remains closed or until the temperature is restored to normal.

If the furnace temperature is suddenly lowered by a considerable amount, say in excess of six degrees, the thermostat causes the quick-acting control means to come into operation and to immediately increase the fuel supply by a substantial amount so as to quickly buid up the fire and to restore the normal temperature.

For the above purpose a mutliple range condition-responsive device is employed. This may comprise, for example, a thermostat having a pair of sets of contacts, one set, which may be called the slow-acting contacts, being operated in response to minor fluctuations in temperature, and the other set, which may be called the quick-acting contacts, being operated only in response to wide fluctuations in temperature.

The two sets of contacts are connected to a motor-control device reversibly operated in accordance with the various contacts which may be closed from time to time by the thermostat and which control the position of the condition-control device. The connection between the above-mentioned contacts and the motor-control unit is such that the motor operates to produce a comparatively wide change in position of the condition-control means in response to closure of the quick-acting contacts and operates to produce timed relatively narrow changes in the condition-control means in response to closure of of slow-acting contacts.

For the latter purpose, a set of timed contacts are connected in circuit with the slow-acting contacts. These are timed in accordance with the furnace operating characteristics so as to produce a succession of small changes in position of the condition-control means at regular intervals while the slow-acting contacts are closed. For example, if a given change produced by a single closure of the slow-acting and the timed contacts would normally be sufficient to change the furnace temperature by two degrees in say three minutes, the timed contacts would be arranged to close at intervals in excess of three minutes. The slow-acting contacts accordingly would first produce the predetermined small change in operating conditions which at the end of three minutes would normally restore the conditions to their predetermined value. If, however, at the end of three minutes the conditions had not been returned to normal, the slow-acting contacts would remain closed and the timed contacts would cause another small change in position of the control means. This succession of small changes would continue until the conditions were again restored to normal and the circuit broken at the slow-acting contacts.

The novel features which are believed to be characteristic of this invention will be particularly pointed out in the claims appended hereto, but the invention itself, as to its objects and advantages and the manner in which it may be carried out, may be better understood by referring to the following description taken in connection with the accompanying drawings forming a part thereof, in the various figures of which like reference characters have been used to designate like parts.

One embodiment of the invention is shown in the accompanying drawings in which:

Figure 5 is a top plan view of the condition-control unit shown in Figure 2;

Figure 6 is a section taken on the line 6—6 of Figure 3 showing the commutator and brushes;

Figure 7 is a front elevation of the control arm;

Figure 8 is a section taken on the line 8—8 of Figure 7.

Figure 9 is an enlarged sectional view of the timed contact mechanism taken along the line 9—9 of Figure 4;

Figure 10 is a side elevation of a preferred type of motor for the motor-control unit; and Figure 11 is a longitudinal section of the condition-responsive device.

In the following description and in the claims various details will be identified by specific names for convenience, but they are intended to be as generic in their application as the art will permit.

Figure 1:
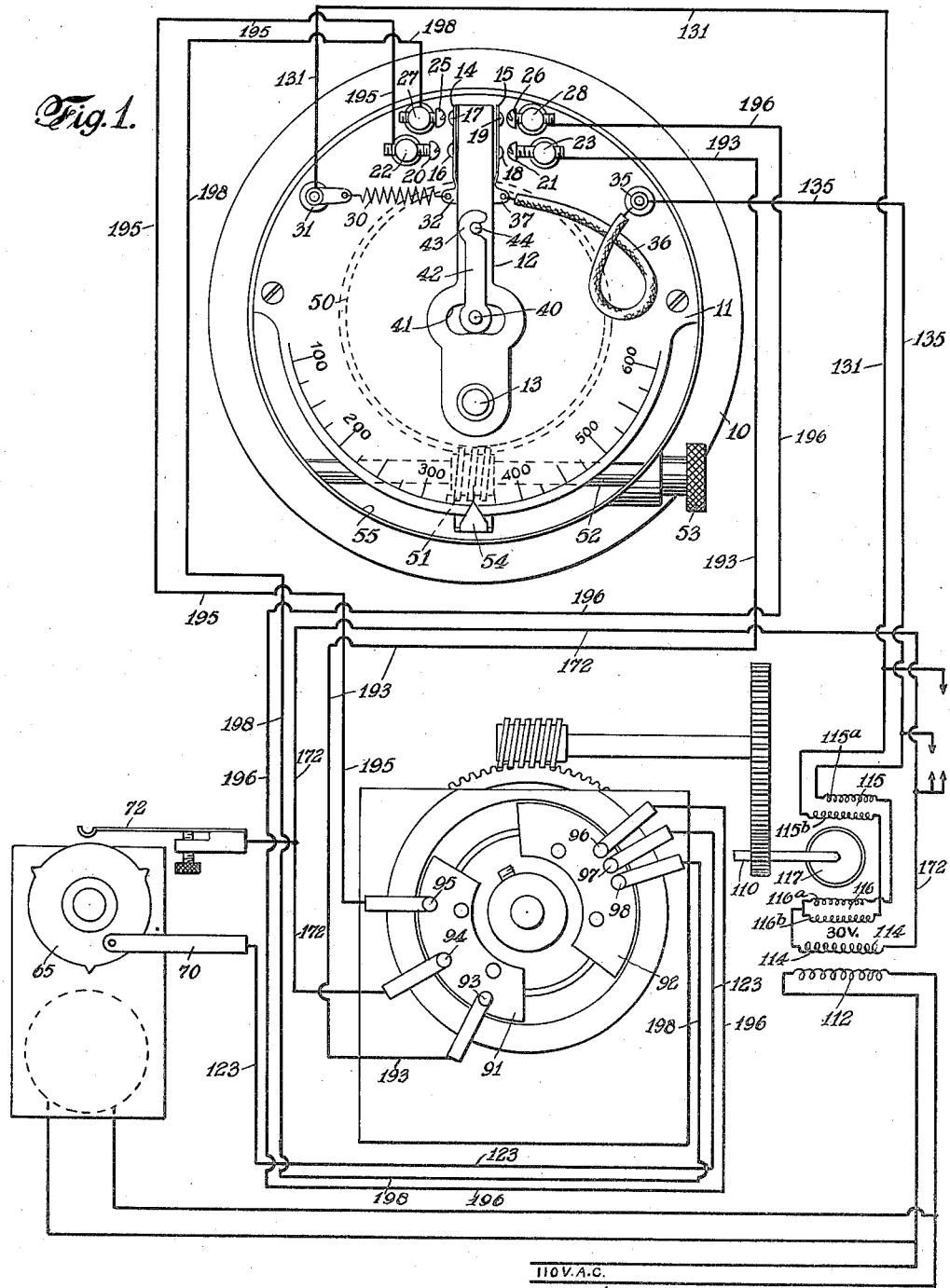
Figure 1 is a diagrammatic view of a condition-control apparatus constructed in accordance with the present invention showing the electrical connections between the various parts.

Referring more particularly to Figure 1, the condition-responsive mechanism is shown as comprising a casing 10 carrying an index plate 11. A control lever 12 is pivotally mounted on a fulcrum stud 13 carried by the casing 10. The control lever 12 carries on opposite sides thereof a pair of spring plates 14 and 15 carrying, respectively, cold and hot contacts to be described. The plate 14 carries cold quick-acting contact 16 and cold slow-acting contact 17. The plate 15 carries hot quick-acting contact 18 and hot slow-acting contact 19.

Stationary quick-acting contacts 20 and 21 are carried in binding posts 22 and 23, respectively, in a position to cooperate with cold and hot quick-acting contacts 16 and 18. Stationary slow-acting contacts 25 and 26 are carried respectively in binding posts 27 and 28 in a position to cooperate with cold and hot slow-acting contacts 17 and 19 respectively.

Spring plates 14 and 15 are so constructed as to normally close the slow-acting contacts in response to a relatively slight movement of the control lever 12 about the fulcrum stud 13. In response to further movement of the control lever, the spring plates 14 and 15 become flexed and permit the quick-acting contacts to close. The adjustment of the various contacts is such that the lever can normally ride between the two sets of contacts and only serves to close the contacts of one set or the other when pivotal movement of the lever has occurred.

The lever 12 may be normally held in a position to close the cold contacts by means of a spring 30, which is anchored between stationary connector or binding post 31 and an ear 32 formed on the spring plate 14 or associated therewith. Electrical connection is made to spring plate 14 through said ear 32, spring 30 and binding post 31. A similar connection is made to the plate 15 from binding post 35 by means of a flexible conductor 36 and an ear 37 which is formed on or associated with the plate 15.

The operating mechanism for the lever 12 comprises an operating shaft 40 (Figures 1 and 11) which extends through the casing 10 and through an arcuate slot 41 in the lever 12. Said shaft 40 carries an arm 42 having a hooked end 43 which releasably engages a pin 44 carried on the lever 12. The operating unit is shown as a helical thermostat comprising a bi-metallic helix 45, one end 47 of which is secured to the shaft 40 and the other end 48 of which is carried by a sleeve 46, which is in turn secured to a worm gear 50. The sleeve 46 and the shaft 40 are journalled in the casing 10 in any convenient manner. The worm gear 50 cooperates with a worm 51 carried on a shaft 52 which is also journalled in the casing 10 and is provided with a control knob 53. A pointer 54 is carried by the worm gear 50 and extends through an arcuate slot 55 in the casing 10 registering the index plate 11.

The operation of the above-described condition-responsive device is such that when the helix 45 becomes heated it tends to rotate the shaft 40 in a clockwise direction as seen in Figure 1, thereby bringing the arm 42 into contact with the pin 44 and tending to cause clockwise pivotal movement of the control lever 12 about the fulcrum stud 13. A slight movement of the lever 12 in this direction serves to close the slow-acting hot contacts 19 and 26. A further movement of the lever 12 in the same direction closes the quick-acting contacts 18 and 21.

As the helix 45 becomes cooled, counter-clockwise movement of the shaft 40 is produced which causes counter-clockwise movement of the arm 42, thereby releasing the pressure of said arm on the pin 44 and permitting the lever 12 to be moved in a counter-clockwise direction in response to tension of the spring 30. Movement in this direction first breaks the quick-acting hot contacts 18 and 21 and then breaks the slow-acting hot contacts 19 and 26. The lever is then in its normal operating position. Further movement in a counter-clockwise direction first closes the cold slow-acting contacts 17 and 25 and then closes the cold quick-acting contacts 16 and 20. After the latter contacts have been closed, if the helix 45 is further cooled, the arm 42 becomes disengaged from the pin 44 and backs away from the pin in response to counter-clockwise movement of the shaft 40.

If the thermostat has a normal operating range of, for example, 450° F. and is sufficiently sensitive to cause closure of the slow-acting contacts in response to a temperature variation of say two degrees and to cause closure of the quick-acting contacts in response to a temperature variation of say six degrees, then the thermostatic element would of necessity be subjected to a relatively wide movement between 0° and 450°.

The above construction permits this movement to take place without restriction since the operating elements of the thermostat become released from the control lever 12. This invention accordingly prevents the helix from being restrained in its movement and prevents the same from obtaining the permanent set due to such restriction. It has been found that a thermostat of this type forms a highly reliable temperature-responsive unit, provided it is not so restricted in its movement in response to temperature changes that a permanent set in the helix takes place. The present device can accordingly be made extremely sensitive in its working range without interfering with the free movement of the helix at other temperature ranges.

Figure 4:
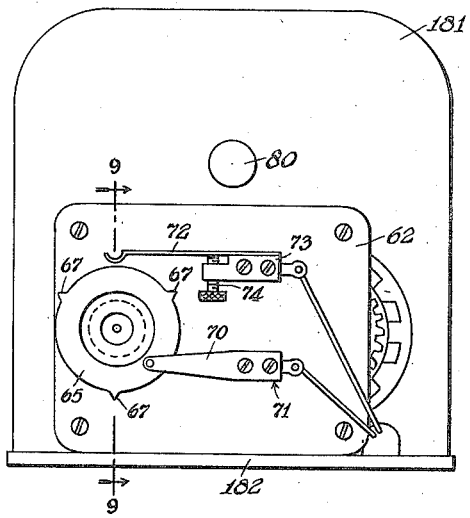
Figure 4 is an end elevation of the condition-control mechanism with the cover removed to show the timed contacts.
Figure 2:
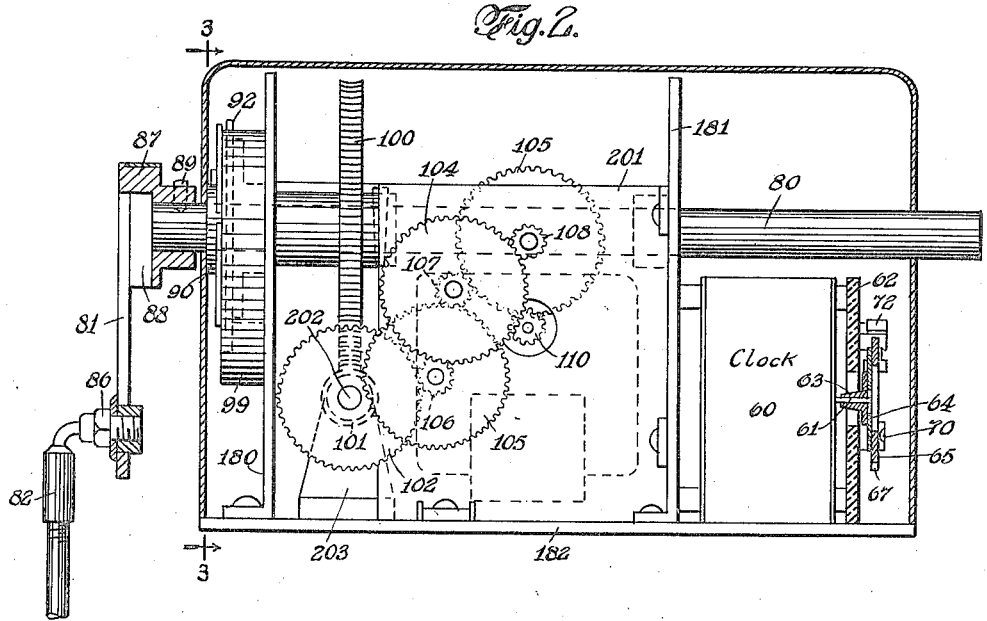
Figure 2 is a side elevation of the condition-control unit showing the motor section and the timed contacts.

Referring to Figures 2, 4 and 9, the timed contact mechanism is shown as comprising a clock 60 which is preferably a self-starting synchronous electric clock of a type which is well known in the art, having the usual clock mechanism (not shown) and a fifteen minute shaft 61 extending therefrom and through an insulating supporting plate 62. To said shaft 61 is secured a supporting collar 63 carrying an insulating ring 64 to which a contact disc or plate 65 is removably secured as by means of screws 66. Said contact disc 65, in the form shown, carries three contact projections 67 which are equally spaced about said disc. A stationary contact brush 70 is mounted on a suitable support 71 carried on the plate 62 and engages the face of said plate 65. A second contact brush 72 is also mounted on a support 73 carried on the plate 62 and may be adjusted in position by a set screw 74. Adjustment of the position of the contact brush 72 determines the extent of its engagement with the contact projections 67 and thereby the time interval during which said contacts are closed. The three contact projections 67 illustrated in the drawings serve to cause contact with the brush 72 to be made every five minutes. It is obvious, however, that this number is selected only by way of illustration and that the number of contact projections may be varied as desired. It is also obvious that the plate 65 may be carried by any of the other shafts of the clockwork mechanism and is not necessarily secured to the fifteen minute shaft.

Referring to Figures 2, 5, 7 and 8, the motor unit comprises a main operating shaft 80 journalled in suitable bearings in supporting plates 180 and 181 which are mounted on base 182. The shaft 80 carries at one end an operating lever 81 which is adapted to be connected to the control mechanism of the furnace by a suitable linkage, as, for example, by a link 82 which is pivotally connected to the lever 81 by a pivotal connection comprising a bushing 83 having flanges 84 which engage the face of the lever 81. The bushing 83 is slidably clamped in a slot 85 of the lever 81 by a nut 86. The lever 81 is carried by a collar 87 having a channel 88 formed therein to receive flanges 84 of the bushing 83, the arrangement being such that said bushing may be positioned substantially at the center of the shaft 80 if an extremely short lever arm is required. The collar 87 may be adjustably secured to the shaft 80 by a set screw 89.

Figure 3:
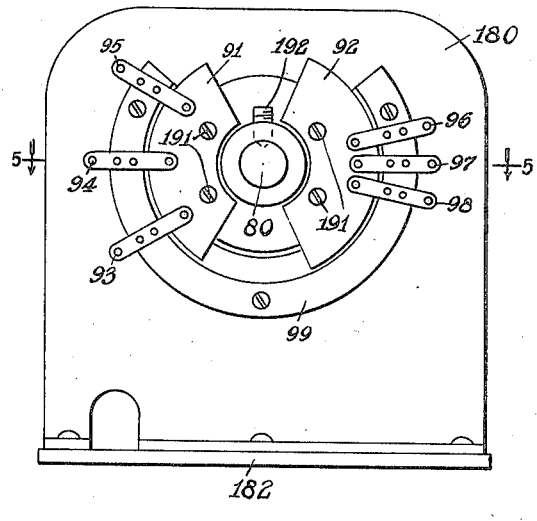
Figure 3 is a section taken on the line 3—3 of Figure 2 showing the motor-control commutator.

The shaft 80 also carries an insulating bushing 90 provided with a flange 190 having a pair of commutator segments 91 and 92 secured to the face thereof as by screws 191 (Figures 3 and 6). Quick-acting contact brushes 93, 94 and 95 engage the commutator segment 91 and slow-acting brushes 96, 97 and 98 engage the commutator segment 92. Said brushes are mounted on an insulating segment 99 which is carried by supporting plate 180. Bushing 90 may be secured to the shaft 80 by suitable means such as set screw 192.

The shaft 80 also carries a worm gear 100 which engages a worm 101, said worm being operatively connected through a gear train comprising gears 102 to 105 and pinions 106 to 109 to a motor shaft 110 of a motor 111. The gears 103 to 105 and the pinions 106 to 108 are carried on idler shafts journalled in supporting plate 201 which is secured to supporting plate 181 above described. Worm 101 and gear 102 are carried on a shaft 202 which is journalled in support 203 carried by base 182. Pinion 109 is carried by motor shaft 110.

Motor 111 is of the reversing type. In a preferred form of the invention this motor is provided with a squirrel cage rotor 117 and field pole pieces 113 which are energized by a 110 V. A. C. field coil 112. This field coil 112 also serves as a transformer primary and induces a lower voltage of, for example, 30 volts in a secondary 114. The field pole pieces 113 are provided with a pair of shading coils 115, 116, each of which comprises a pair of oppositely wound coils 115a, 115b, 116a and 116b respectively. These shading coils are selectively energized from the 30 volt secondary 114 by suitable leads and contacts to be described. The arrangement is such that the motor will not start until one of the sets of shading coils is energized, thus distorting the field in a manner known in the art so as to exert a driving torque on the rotor 117. The direction of rotation of the rotor will depend upon the particular set of shading coils which is energized. The apparatus exerts sufficient drag on the motor to prevent the motor from operating after the shading coils are deenergized by breaking the circuit to secondary 114 in the manner to be described. Obviously, additional braking force may be exerted by other means if necessary.

Referring again to Figure 1, it will be noted that the binding posts 27 and 28 carrying the slow-acting contacts 25 and 26 are connected to the slow-acting contact brushes 98 and 96 by leads 198 and 196 respectively. The return brush 97 is connected through a lead 123 to the brush 70, which engages the timed contact plate 65. The brush 72 is connected by the return lead 172 to one side of secondary 114.

The binding posts 22 and 23 carrying the quick-acting contacts 20 and 21, respectively, are connected by leads 195 and 193 to the quick-acting brushes 95 and 93 respectively, engaging the commutator segment 91. The return brush 94 is connected to the return lead 172 above mentioned. The binding posts 31 and 35 of the thermostatic unit are connected by leads 131 and 135 to shading coils 115b and 115a, respectively, thence through shading coils 116b and 116a, respectively, to the secondary 114.

The selective closing of the slow-acting and quick-acting hot and cold contacts of the thermostat have been above described. The closure of either of the slow-acting contacts completes a circuit from secondary 114 through shading coils 115 and 116, lead 131 or 135, and brush 96 or 98, thence through the commutator segment 92, the return brush 97, the lead 123, the brush 70, the timed contact plate 65, the timed contact brush 72 and the return lead 172 to the secondary 114. As long as either the hot or cold slow-acting contact remains closed, the circuit from secondary 114 to one of the shading coil pairs will be completed each time the contact projection 67 on the plate 65 engages the timed contact brush 72. The motor will accordingly operate in one direction or the other, depending upon whether the hot or cold contact is closed as long as the time contact 72 remains closed. This operation of the motor rotates the shaft 80, thereby causing rotation of the commutator segment 92 and of the lever 81. This movement of the lever 81 is transferred to the control mechanism as, for example, to the furnace fuel supply, and serves to increase or decrease the fuel supply by a given amount.

In the embodiment disclosed, if the condition has not been restored to normal at the end of five minutes a second timed contact is made by a projection 67 engaging the brush 72, and a further similar movement of the motor and operating mechanism takes place. This movement is repeated at successive intervals until normal conditions are restored and the slow-acting contact 25 or 26 is broken, or until the commutator segment 92 runs out from under one of the brushes 96 or 98.

The extent of each of the above-mentioned step-by-step movements may be controlled by adjusting the tension of the brush 72, as by manipulation of the set screw 74, and the frequency of such movements can be controlled by varying the number of contact projections 67 on the plate 65, or by changing the speed of said plate.

When the temperature has changed sufficiently to close one of the quick-acting contacts 20 or 21, the circuit is completed from secondary 114, through shading coils 115 and 116, lead 131 or 135, and binding post 22 or 23 to a brush 93 or 95, thence through the commutator segment 91, the return brush 94 and the return lead 172 to secondary 114. Completion of this circuit causes immediate operation of the motor until the commutator segment 91 has run out from under the brush 93 or 95 or until the quick-acting contacts are broken. Thereafter, it will be noted that the operation of the step-by-step control may take place in response to repeated closures of the timed contact 72.

In the embodiment disclosed, the position of the brushes 96 and 98 on the commutator segment 92 is such that the slow-acting mechanism may cause rotation of the shaft 80 and of the commutator and the control lever associated therewith through an arc of approximately 120°. The position of the brushes 93 and 95 on the commutator segment 91 is such that movement of the motor mechanism in response to closure of the quick-acting circuits may take place through an arc approximately 60°. Assuming by way of example that the 120° movement of the control arm 81 is sufficient to change the fire from 100% to 0, it will be noted that this entire range of fire may be obtained by the slow-acting mechanism, whereas a range of only between 25% and 75% of full fire may be obtained by the quick-acting contacts.

The quick-acting contacts will serve to operate the control arm 81 from any given position to a maximum or a minimum of 75% and 25%. Thereafter, the slow-acting contacts can operate between the maximum and minimum of 100% and 0.

A specific embodiment of the above-described invention has been shown and described solely for purposes of illustration. It is obvious that various modifications and changes may be made therein. For example, the control device is not to be limited to a double-range, condition-responsive means. Obviously, any desired number of sets of contacts could be employed, each of which could operate through a different control range. Furthermore, the type of motor could be varied and the invention may be applied to the control of various conditions and media. The invention is accordingly to be limited only in accordance with the scope of the following claims when interpreted in view of the prior art.

I claim:

1. In combination, a condition-control means comprising a condition-control member, a single reversible motor for progressively operating said member, a commutator associated with said motor, slow-acting brushes and quick-acting brushes engaging said commutator, means to energize said slow-acting brushes and said quick-acting brushes, respectively, in response to small and large changes in condition, and means associated with said slow-acting brushes adapted to cause step-by-step operation of said motor, said quick-acting brushes when energized being adapted to cause said motor to operate continuously throughout the extent of their contact with said commutator.

2. In combination, a condition-control element, a motor adapted to operate said element, a commutator associated with and rotatable with said element, quick-acting brushes engaging said commutator and adapted to reversibly operate said motor throughout the extent of contact therewith, slow-acting brushes engaging said commutator, means responsive to large and small changes in condition to selectively energize said quick-acting brushes and said slow-acting brushes, respectively, and timed means associated with said slow-acting brushes adapted to cause step-by-step operation of said motor within the range of contact of said slow-acting brushes with said commutator.

3. In combination, a condition-control element, a motor adapted to operate said element, a commutator associated with and rotatable with said element, quick-acting brushes engaging said commutator and adapted to reversibly operate said motor throughout the extent of contact therewith, slow-acting brushes engaging said commutator, means responsive to large and small changes in condition to selectively energize said quick-acting brushes and said slow-acting brushes, respectively, and timed means associated with said slow-acting brushes adapted to cause step-by-step operation of said motor within the range of contact of said slow-acting brushes with said commutator, said slow-acting brushes being adapted to operate said motor over a wider range than said quick-acting brushes.

HAZOR J. SMITH.